US006826675B1

United States Patent
Tormey et al.

(10) Patent No.: US 6,826,675 B1
(45) Date of Patent: Nov. 30, 2004

(54) STACK UTILIZATION MANAGEMENT SYSTEM AND METHOD FOR A SINGLE-STACK ARRANGEMENT

(75) Inventors: Dan Tormey, Richardson, TX (US); Joe Bolding, Allen, TX (US); Gerald Everett, Alta, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 09/973,156

(22) Filed: Oct. 9, 2001

(51) Int. Cl.[7] ................................................. G08F 9/30
(52) U.S. Cl. ...................................................... 712/202
(58) Field of Search .......................... 712/202; 711/132

(56) References Cited

U.S. PATENT DOCUMENTS 5,903,899 A * 5/1999 Steele, Jr. .................... 707/206
6,449,625 B1 * 9/2002 Wang ........................... 707/206

* cited by examiner

Primary Examiner—Jack Lane

(57) ABSTRACT

A system and method for managing utilization in a unidirectional stack. An application programming interface (API) is provided for facilitating user interaction with a stack management system associated with a computing environment such as an architectural simulator. The unidirectional stack is initialized via the API with respect to a fixed stack marker boundary, a stack base and a stack pointer. A high water mark is maintained for tracking the stack pointer's farthest location from the stack base during the execution of a program. When a program instruction is operable to access a stack location, one or more validity rules are applied to determine if the access operation is permissible. Where the program instruction is operable to modify the stack pointer, another set of validity rules are applied to determine if the stack pointer operation is permissible. User warning and optional return of program control are available when an invalid access operation or stack pointer operation is attempted.

13 Claims, 10 Drawing Sheets

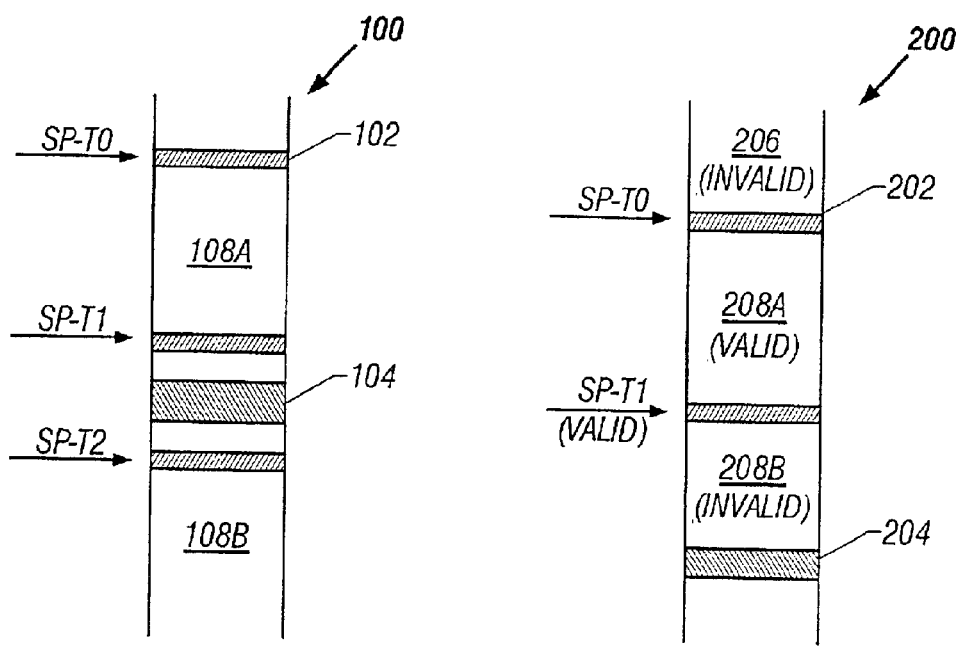
FIG. 1
(Prior Art)
FIG. 2A
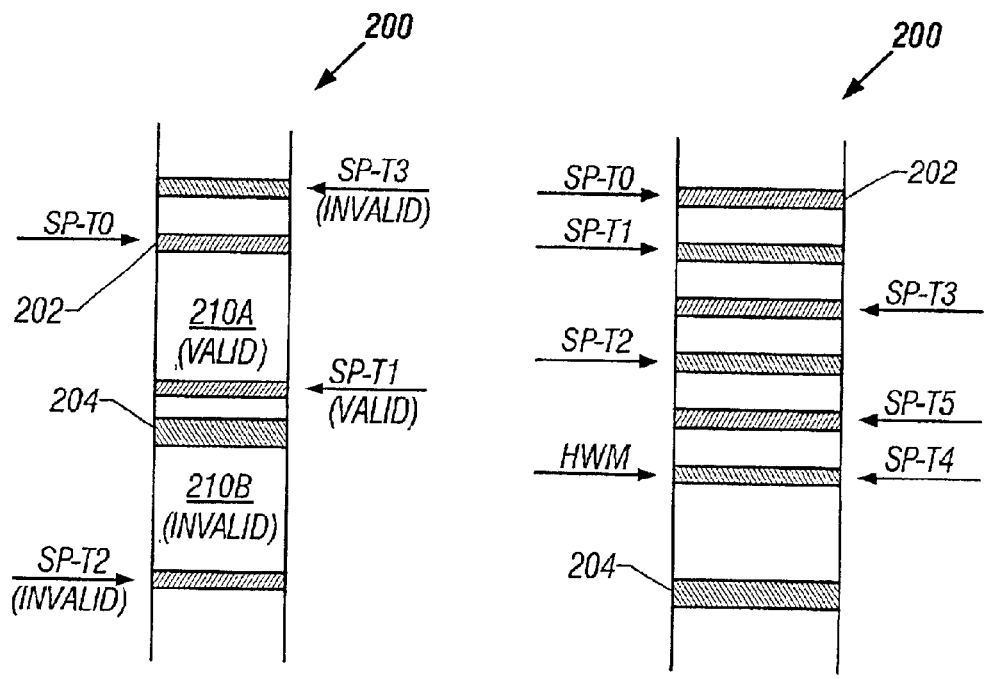
FIG. 2B
FIG. 2C

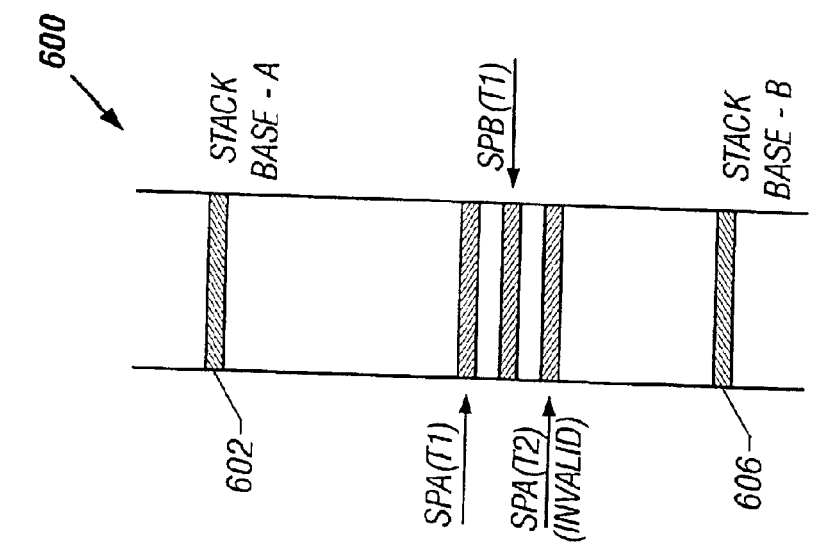
*FIG. 6B*
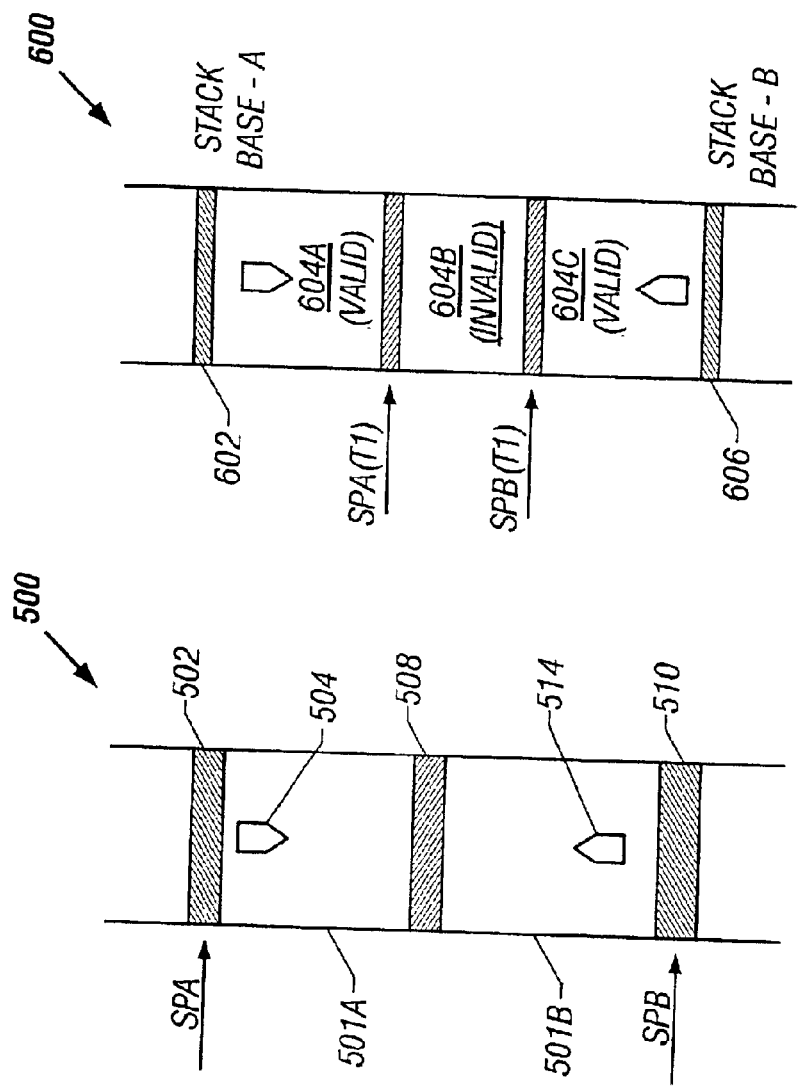
*FIG. 6A*
*FIG. 5 (Prior Art)*

STACK UTILIZATION MANAGEMENT SYSTEM AND METHOD FOR A SINGLE-STACK ARRANGEMENT

CROSS-REFERENCE TO RELATED APPLICATION(S)

This application discloses subject matter related to the subject matter disclosed in the following commonly owned co-pending patent application(s): (i) "Stack Utilization Management System And Method For A Two-Stack Arrangement," filed even date herewith, application Ser. No. 09/973,665, in the name(s) of: Dan Tormey, Joe Bolding and Gerald Everett.

BACKGROUND OF THE INVENTION

1. Technical Field of the Invention

The present invention generally relates to computer systems. More particularly, and not by way of any limitation, the present invention is directed to a system and method for managing stack utilization in a high performance multiprocessing environment.

2. Description of Related Art

The use of stacks in association with program execution in computing environments is well known: stacks are initialized, contents are pushed or pulled based on calls to and returns from sub-functions, subroutines, etc., and the programs are executed to completion. There is no automatic way, however, to determine the required depth of a stack before a program is launched. Accordingly, it becomes necessary to ensure that there is no conflicting use of stack space due to, e.g., stack overflow, which can otherwise lead to stack corruption.

Two solutions are currently available. In one existing arrangement, the user is required to inspect the program code manually and place debug statements in the code to ensure that the stacks growing towards each other (for example, a stack area initialized for the program, which grows in one direction, and its associated register spill area set up by the operating system, which grows in the opposite direction) do not use the same memory. Another solution is to fill stack memory with markers having specific bit patterns. The code is executed in normal fashion and, after the execution is complete, the user needs to verify that the markers still exist.

While these solutions are generally useful, they are nevertheless beset with several shortcomings and disadvantages. First, forcing the user to step through the code manually is extremely inconvenient and imposes severe performance-related constraints. On the other hand, embedding marker patterns at arbitrary locations in a stack area is not a highly reliable mechanism for detecting stack overflow. For example, even if the marker pattern remained after executing the program, it is no guarantee that there was no stack overflow because the instruction(s) overwriting the marker area might have written a pattern that is identical to the marker pattern. Also, there may be situations where stack overflow does not actually overwrite the marker location. Rather, the overflow may simply "skip" the marker area in the stack, which makes it very difficult to diagnose a corrupted stack. Further, where two-stack arrangements are implemented, each stack growing towards the other, there is the additional problem of not being able to identify which of the two stacks actually caused the overflow.

Additionally, regardless of whether one-stack or two-stack arrangements are utilized, the conventional stack utilization management schemes are woefully inadequate with respect to detecting stack conditions that are either invalid or have the potential to become so. For instance, where stack pointer operations are involved, the current techniques do not test whether a new location to which the stack pointer is to be moved may violate a predetermined stack range. Also, because only write operations that affect the marker's bit pattern are detectable, invalid conditions arising out of read operations cannot be discovered in the present schemes.

SUMMARY OF THE INVENTION

In one embodiment, a system and method is disclosed for managing stack utilization with particular reference to single-stack arrangements in a computing environment such as, for example, architectural simulators for multiprocessor (MP) platforms, specific hardware implementations having known or heretofore unknown computer architectures, and the like. An application programming interface (API) is provided for facilitating user interaction with a stack management system associated with the computing environment, whereby an exemplary unidirectional single stack is initialized with respect to a fixed stack marker boundary, a stack base and a stack pointer. A high water mark is maintained for tracking the stack pointer's farthest location from the stack base attained during the execution of a program. When a program instruction is operable to access a stack location, one or more validity rules are applied to determine if the access operation is permissible. Where the program instruction is operable to modify the stack pointer, another set of validity rules are applied to determine if the stack pointer operation is permissible. User warning and optional return of program control are available when an invalid access operation or stack pointer operation is attempted.

In one aspect, the present invention is directed to a method for managing utilization of a unidirectional stack. Upon fetching a program instruction to be executed in a computing environment, a determination is made whether the program instruction requires or involves accessing a location in the unidirectional stack. If so, a further determination is made whether the location to be accessed is within a predetermined valid stack range (e.g., the stack area bounded by the stack base and the current location of a valid stack pointer associated therewith). In one exemplary mode of operation, a user warning is provided upon determining that the location to be accessed is not within the predetermined valid stack range specified with respect to the stack base of the stack. In another exemplary mode of operation, control may be returned to the user or a suitable interrupt handler.

In another exemplary embodiment of the present invention, the methodology for managing stack utilization is operable to verify whether a stack pointer operation is capable of giving rise to stack overflow. The unidirectional stack is preferably initialized with a fixed stack marker, a stack base and a stack pointer. Also, a high water mark is initialized for tracking the stack pointer's location during execution of a program in a computing environment. Upon fetching a program instruction to be executed in the computing environment, a determination is made if the program instruction is operable to modify the stack pointer's current location to a new location in the unidirectional stack. If so, a further determination is made whether the new location is within a predetermined stack range (e.g., comprising a region bounded by the stack base and stack marker). If the location is not within the predetermined stack range, a suitable warning may be provided. Optionally, control may be returned to the user or an interrupt handler.

In another aspect, the present invention is directed to a system for managing utilization of a unidirectional stack. An interfacing structure is provided in conjunction with an architectural simulator or actual hardware platform to initialize a fixed stack marker and a stack base for the unidirectional stack in the computing environment. A software or hardware structure is provided for determining if a program instruction requires accessing a location or modifying the current stack pointer's location in the unidirectional stack. Warning means are available for providing a warning upon determining that the location to be accessed or the stack pointer's new location is not within a valid stack range. Optionally, the stack utilization management system may include appropriate interrupt handlers when control is returned upon determining that the validity conditions are not satisfied.

BRIEF DESCRIPTION OF THE DRAWINGS

A more complete understanding of the present invention may be had by reference to the following Detailed Description when taken in conjunction with the accompanying drawings wherein:

FIG. 1 (Prior Art) depicts a unidirectional stack managed in a conventional manner;

FIG. 2A depicts an exemplary unidirectional stack managed in accordance with the teachings of the present invention where read or write accesses relative to the stack are tested;

FIG. 2B depicts the exemplary unidirectional stack where stack pointer operations are tested in accordance with the teachings of the present invention;

FIG. 2C depicts the exemplary unidirectional stack where a stack pointer's high water mark is tracked in accordance with the teachings of the present invention;

FIG. 5 (Prior Art) depicts a conventional two-stack arrangement where the stacks are operable to grow towards each other;

FIG. 6A depicts an exemplary two-stack arrangement managed in accordance with the teachings of the present invention where read or write accesses relative to either of the stacks are tested;

FIG. 6B depicts the exemplary two-stack arrangement where stack pointer operations are tested in accordance with the teachings of the present invention;

DETAILED DESCRIPTION OF THE DRAWINGS

Figure 3:
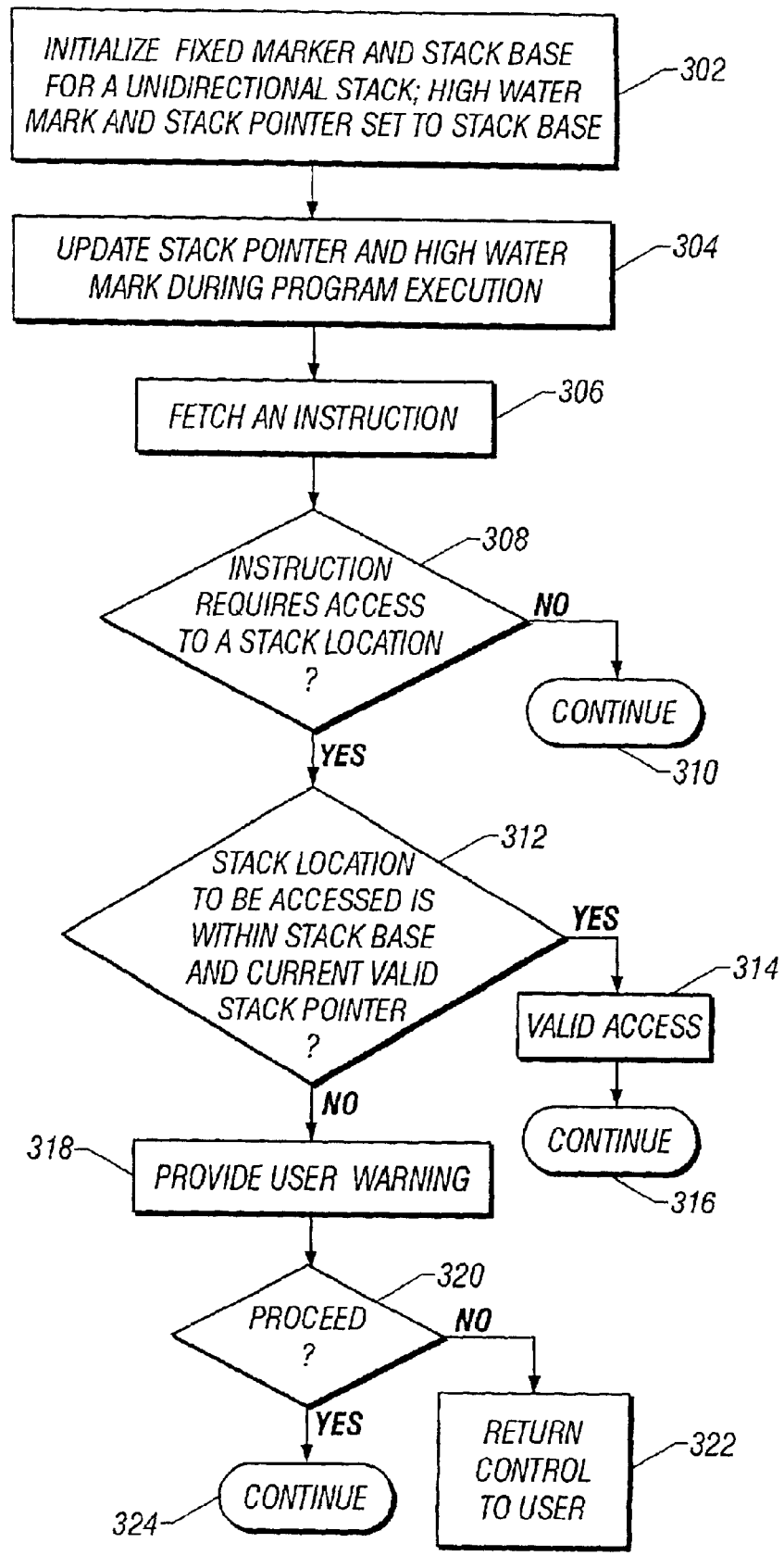
FIG. 3 depicts a flow chart of the various steps involved in an exemplary stack utilization management method for managing a unidirectional stack in accordance with the teachings of the present invention.

In the drawings, like or similar elements are designated with identical reference numerals throughout the several views thereof, and the various elements depicted are not necessarily drawn to scale. Referring now to FIG. 1, depicted therein is a unidirectional stack 100 that is managed in a conventional manner. A starting location 102 of the single stack 100 is set at a location that defines the single stack's stack base. A stack pointer (SP) associated with the stack is initialized to the stack base. Reference label SP-T0 represents the SP at time T0. An arbitrary stack boundary marker is set at a location or region 104 relative to the stack base 102 for defining an expected maximum growth area 108A. Region 108B, which is contiguous with region 108A, may be occupied by other stacks, code portions, or other data, etc.

The stack boundary marker 104 is typically initialized with a predetermined bit pattern. When a program is executed, the arguments (e.g., local variables, etc.) and data associated with the program's subroutines and functions are pushed to the stack depending on where the stack pointer is. Accesses to or from the various stack locations are effectuated relative to the stack pointer's current location. Upon returning control from the subroutines, the local variables and data are pulled from the stack. Accordingly, as the stack 100 grows and/or contracts during the execution of the program, the stack pointer also moves in accordance with stack utilization. In FIG. 1, SP-T1 and SP-T2 refer to the locations of the stack pointer at two different instances.

It is possible for the stack pointer to go beyond the expected maximum growth area 108A in the conventional arrangement. Thus, when the stack grows, it may overflow the boundary 104 and possibly corrupt the code and/or data in the region 108B. When the user examines the boundary marker's bit pattern upon completion of the program's execution, an altered pattern therein caused during the overflow indicates the strong possibility of a corrupted stack. However, as pointed out in the Background section of the present patent application, there are several limitations in this approach including the lack of capability to detect illegal read/write accesses and invalid stack pointer operations.

FIG. 2A depicts an exemplary unidirectional stack 200 that is managed in accordance with the teachings of the present invention, wherein read and/or write accesses are tested prior to execution for conditions that can give rise to stack corruption and invalid stack conditions. A starting point 202 (i.e., stack base) of the stack 200 is set, preferably via an application programming interface (API) provided in conjunction with an architectural simulator or with an actual hardware platform. The stack pointer (SP) is initialized to the stack base 202 at T0. A stack marker 204 is set up at a location that demarcates a potential growth area for the stack. However, this potential stack growth area is dynamically divided into a valid area 208A and an invalid area 208B, depending upon the current valid location of the SP. For instance, reference label SP-T1 refers to a location within the potential stack growth area bounded between the stack base 202 and the marker 204 (hence a valid SP location), which defines the valid and invalid areas with respect to stack location accesses. Accordingly, any area above or over the stack base 202 (assuming that the unidirectional stack 200 is operable to grow downward) is also treated as an invalid access region for purposes of the present invention. Therefore, any read/write access to a stack location within the area 208A (bounded by the stack base 202 and current valid SP location, including the boundary locations) is a valid access and will be processed normally. On the other hand, a read or write access involving a location in the regions 206 or 208B will be treated as an invalid access operation and appropriate procedures may be instituted to provide warning and/or return of control. These various steps will be described in greater detail hereinbelow with respect to the flow chart depicted in FIG. 3.

FIG. 2B depicts the exemplary unidirectional stack 200 where stack pointer operations are tested in accordance with the teachings of the present invention. Again, the stack base 202 is set up for the stack 200, preferably with a direction indicator which specifies the direction of stack growth during the execution of a program. Reference label SP-T0 refers to the initial location of the SP associated with the stack. When a program instruction operable to modify the current SP, a plurality of conditions are checked to ensure that the new SP location is still valid. In an exemplary scenario, for instance, if the new SP location is within a region 210A bounded by the marker 204, the SP operation is considered as a valid operation and may proceed normally. Reference label SP-T1 refers to a new SP location at time T1 in the valid region 210A. In similar fashion, any SP operation that attempts to modify the current SP location to the marker location or beyond (i.e., region 210B), or above the stack base 202 is considered as an illegal stack pointer operation, and appropriate cautionary procedures may be employed depending upon particular implementation. Reference labels SP-T2 and SP-T3 refer to two such illegal SP locations which are detectable in accordance with the teachings of the present invention.

As a further guard against possible stack corruption resulting from overflow, the present invention introduces the concept of a "high water mark," which is operable to track a stack pointer's movement during the execution of a program and thus identify the farthest location to which the stack pointer has traveled with respect to the stack base. Referring now to FIG. 2C, shown therein is the exemplary unidirectional stack 200 where a stack pointer's high water mark (HWM) is tracked in accordance with the teachings of the present invention. The stack's base 202 and SP are initialized as explained hereinabove. Depending upon how the stack is utilized, the stack pointer is located at SP-T1, SP-T2, SP-T3, SP-T4 and SP-T5 at different instances during a program run. Where the HWM is initialized to the stack base, it moves with the SP as the program is executed, changing only when the new SP is lower than (or, greater than, if the direction of growth is in the opposite direction, i.e., upward direction) the current SP location. As exemplified in FIG. 2C, the farthest location from the stack base 202 to which the stack pointer has traveled is SP-T4, which is identified at the end of the run as the high water mark of the stack.

It should be readily appreciated that by identifying a stack's high water mark for a particular program, the placement of a marker zone can be optimized based on historical high water mark data for the stack. Additionally, the high water mark may also be used in determining whether a particular SP operation involves modifying a current SP location to a new location that is beyond the historical high water mark. Varius such determinations with respect to SP operations will be described in additional detail hereinbelow with particular reference to the flow chart depicted in FIGS. 4A and 4B.

FIG. 3 depicts a flow chart of the various steps involved in an exemplary stack utilization management method for managing a unidirectional stack in accordance with the teachings of the present invention, wherein the validity of read/write accesses is verified with respect to a plurality of predetermined conditions. As explained hereinabove, a stack base and fixed marker are initialized for an exemplary unidirectional stack (such as, e.g., stack 200) pursuant to executing a program. A current high water mark and stack pointer are initially set to the stack base (step 302). Additionally, a direction indicator may also be specified in order to identify the stack's direction of growth. As the program starts executing, the stack pointer and/or the stack's current HWM may be updated as necessary (step 304).

Upon fetching an instruction at any time during the program's execution (step 306), a determination is made if the instruction requires or involves accessing a stack location for a read operation or a write operation (decision block 308). If the instruction does not involve accessing a stack location, the flow continues for normal operations (step 310), whereby the program instruction is executed normally. If, on the other hand, it is determined that the instruction involves accessing a particular stack location, a further determination is made to verify if the stack location to be accessed is within a valid stack range, e.g., a range bounded by the stack base and the current valid SP pointer (decision block 312). If the stack location to be accessed satisfies the valid range condition, a valid access is indicated (step 314) and, subsequently, the access process is continued (step 316).

If the stack location to be accessed does not satisfy the valid range condition, a user warning may be provided (step 318). Thereafter, as an optional determination, the user may be queried (decision block 320) whether to carry on with the program flow which involves an invalid access operation (step 324), or return control to user where the computing environment in which the program is being executed comprises an architectural simulator (step 322). In the exemplary embodiment where the methodology of the present invention is implemented in an actual hardware environment, a suitable default handler may be instigated via interrupts, etc.

Figure 4A:
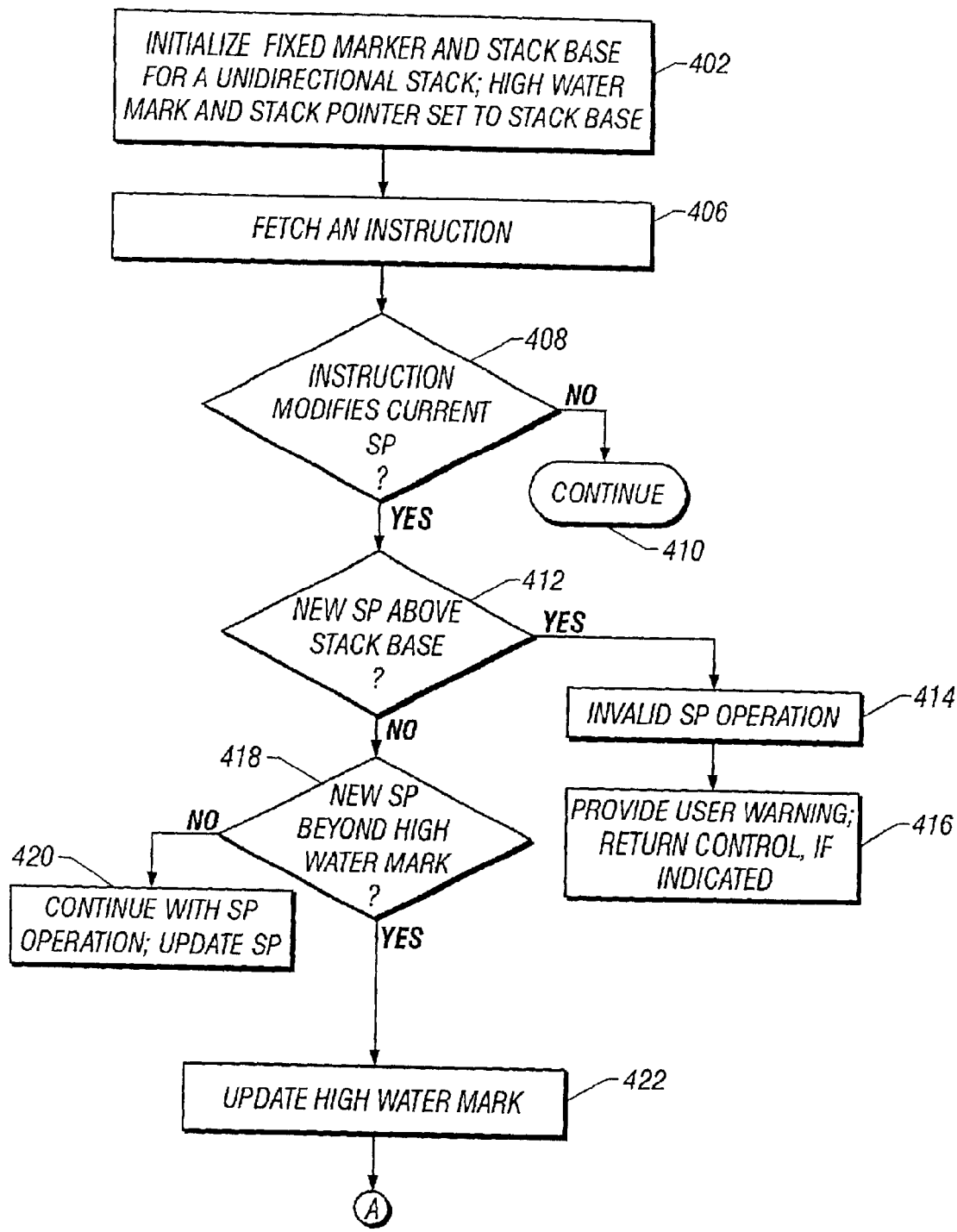
FIGS. 4A and 4B depict a flow chart of the various steps involved in another exemplary stack utilization management method for managing a unidirectional stack in accordance with the teachings of the present invention.
Figure 4B:
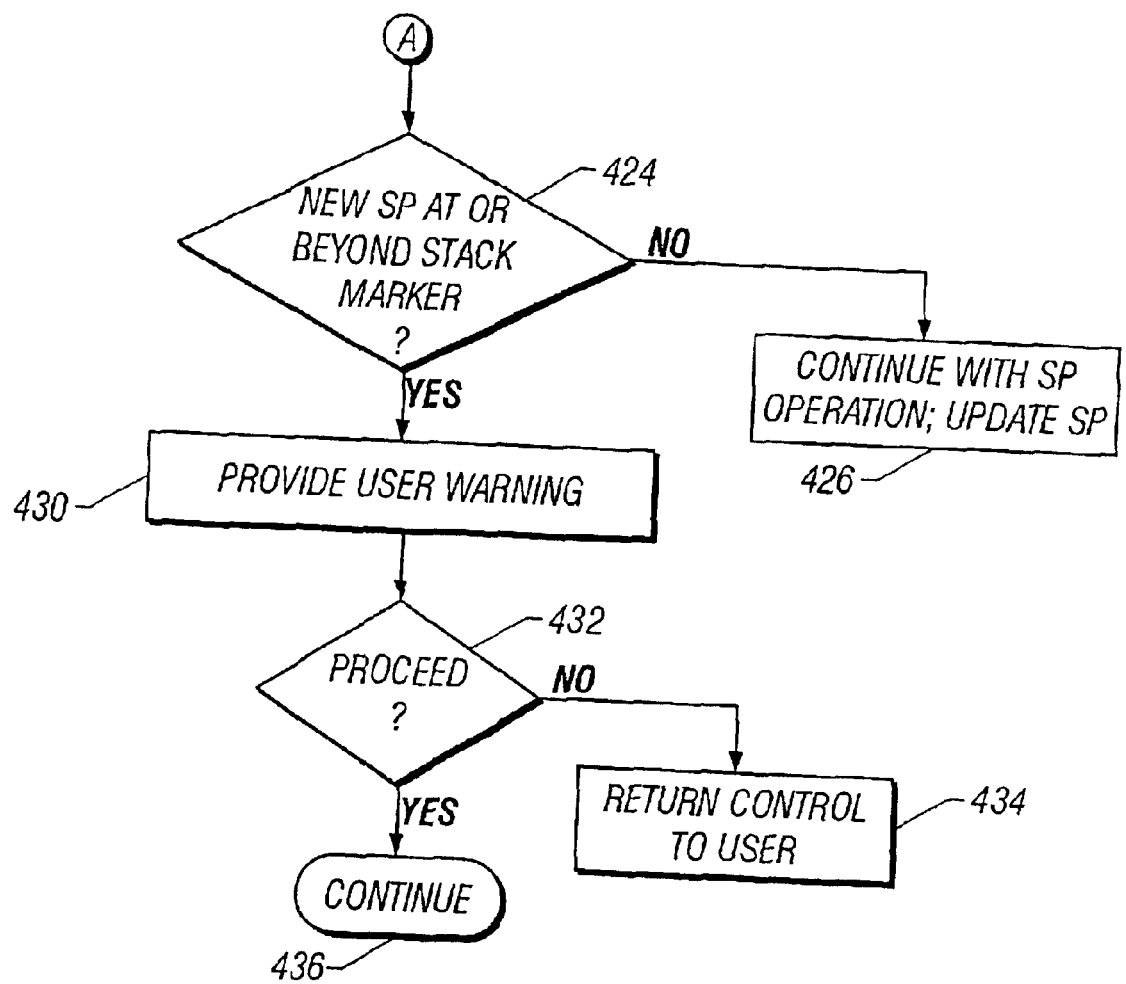

Referring now to FIGS. 4A and 4B together, depicted therein is a flow chart of the various steps involved in another exemplary stack utilization management method for managing a unidirectional stack in accordance with the teachings of the present invention, where the validity of SP operations is verified with respect to a plurality of stack ranges. Similar to the stack access operation management methodology set forth above, the exemplary stack is initialized with respect to its stack base, associated fixed marker and a direction indicator, pursuant to executing a program in a simulated environment or on an actual hardware platform. Also, a stack pointer and current HWM are set to the stack base (step 402). As will be seen below, the stack pointer and/or HWM may be updated as necessary during the program execution.

Upon fetching an instruction at any time during the program's execution (step 406), a determination is made if the instruction requires or involves modifying the current SP location (decision block 408). If the instruction does not involve modifying the SP, the process flow continues to process the instruction in a normal manner (step 410). On the other hand, if the SP's current location is to be changed to a new location, a plurality of conditions are tested to verify whether the new location is located within a predetermined stack range that ensures stack integrity. For instance, in decision block 412, it is determined if the new SP location is beyond the stack base (which could be above the stack base where the stack grows in downward direction, or beneath the stack base where the stack grows in upward direction). If so, the program instruction entails an invalid SP operation (step 414) and, subsequently, steps such providing user warning and/or return of program control may be implemented (step 416). In decision block 418, it is determined if the new SP location is beyond the historical HWM of the stack. If not, the process flow continues with the SP operation. Thereafter, the stack's SP may be updated accordingly (step 420).

If the new SP location is beyond the stack's historical HWM, it may be updated accordingly (step 422). In decision block 424, it is further determined whether the new SP location is located at or beyond the stack marker. If not, the SP operation may proceed in a normal manner, whereby the SP may be updated (step 426). Otherwise, the new SP location indicates an invalid SP, thereby instigating user warning (step 430) and optional return of control. Decision block 432 and steps 434 and 436 exemplify these operations.

Those skilled in the art should readily recognize upon having reference hereto that in one exemplary embodiment of the present invention, the methodology for validating stack access operations and the methodology for validating stack pointer operations may be blended together in many different combinations. Also, the various determinations provided in the respective methodologies may be implemented in any order and in any combination or subcombination thereof. Accordingly, it should be apparent that the stack utilization management method of the present invention is highly susceptible to numerous modifications and rearrangements.

Referring now to FIG. 5, shown therein is a conventional two-stack arrangement 500 where the stacks are operable to grow towards each other. Similar to the unidirectional stack 100 depicted in FIG. 1, a first stack 501A is initialized by its stack pointer (SPA) that initially points to the stack's starting location 502 (i.e., first stack's base). Reference numeral 504 refers to the direction of the first stack's growth. A second stack 501B is similarly initialized by its stack pointer (SPB) that initially points to the second stack's starting location 510 (i.e., second stack's base). Reference numeral 514 refers to the direction of the second stack's growth. Typically, the first stack 501A is exemplified with a downward growth and the second stack 501B is exemplified with an upward growth. Furthermore, the second stack 501B may represent a register spill area that is set up by the operating system when the first stack 501A is initialized for executing the functional calls of a program.

In the conventional arrangement, an arbitrary boundary marker 508 is positioned between the two stack bases 502 and 510. A predetermined bit pattern is initialized therein that is operable as an overflow marker essentially in the same manner as described hereinabove with respect to the conventional unidirectional stack arrangement shown in FIG. 1. As a consequence, the existing stack utilization management schemes for a two-stack system have the same problems as previously alluded to. In addition, where a stack overflow is encountered, there is inherent ambiguity concerning which of the two stacks actually caused it.

FIG. 6A depicts an exemplary two-stack arrangement 600 managed in accordance with the teachings of the present invention, wherein read or write accesses relative to either of the stacks are tested. A first stack initialized by its stack base 602 and a second stack initialized by its stack base 606 are operable to grow towards each other. There is no specific predetermined boundary marker placed between the two stack bases, however. Rather, as will be described in greater detail hereinbelow, the utilization of each stack portion is dynamically managed during the execution of a program relative to the other stack portion in order to ensure that no overflow conditions occur. In one exemplary embodiment of the present invention, one of the stacks (e.g., the upward-growing stack) may be implemented as a register spill area set up by the operating system when the other stack is initialized for function calls.

A first stack pointer (SPA) associated with the first stack is initially set to the stack base 602. A first direction indicator is provided for specifying the direction of growth from the stack base 602. Typically, the stack base 602 may be associated with a "high memory" stack operable to grow downward. A second stack pointer (SPB) associated with the second stack is similarly initialized to point to the second stack's base 606. A second direction indicator is provided for specifying the direction of growth from the stack base 606, which may be associated with a "low memory" that is operable to grow upward.

During the execution of the program, the respective SPs are updated depending upon the occurrence of push and pop operations affecting the two stack portions, which can occur independently as long as there is no overflow. Each SP is thus located at a location which defines a valid stack area with respect to the stack portion it is associated with. For example, reference label SPA(T1) refers to the first stack's SP at time T1. Analogously, reference label SPB(T1) refers to the second stack's SP at time T1. Accordingly, stack area 604A bounded between the stack base 602 and SPA(T1) is defined as a valid stack area which can be accessed by a program instruction involving access to a location in the first stack (i.e., downward-growing stack). Likewise, stack area 604C bounded between the stack base 606 and SPB(T2) is defined as a valid stack area that can be accessed by a program instruction with respect to a location in the second stack (i.e., upward-growing stack). In the valid state where the SPs do not cross over each other, there is a "no man's land" (region 604B), access to which is not permitted. It should be apparent to those skilled in the art upon having reference hereto that the stack access validity rules with respect to the two-stack arrangement are essentially similar to the access validity rules provided in the foregoing section for the single-stack systems (for example, the flow chart depicted in FIG. 3) and, accordingly, will not repeated here for the sake of brevity.

Referring now to FIG. 6B, depicted therein is the exemplary two-stack arrangement 600 where stack pointer operations are tested in accordance with the teachings of the present invention. Similar to the rules set forth above for validating stack pointer operations in a single-stack system, the movement of the SPA and SPB pointers is tested against a plurality of conditions so as to prevent overflow, crossover and other stack management problems. In the exemplary scenario depicted in FIG. 6B, both SPA and SPB are located at valid locations at time T1, as exemplified by SPA(T1) and SPB(T1). Thereafter, when a program instruction which involves modifying the SPA pointer to its new location, i.e., SPA(T2) located in the valid access area for the second stack, is encountered during the execution of the program, the present invention's stack utilization management scheme is operable to detect the ensuing cross-over of the pointers and appropriately alert the user and/or return control.

Since there are two SPs involved and each stack may be provided with a respective HWM, there are various combinations of conditions required to be tested for maintaining stack integrity. For instance, the following conditions may be tested in any combination on an instantaneous basis during the program flow: (i) SPB crosses SPA; (ii) SPB crosses SPA's HWM; (iii) SPA crosses SPB; and (iv) SPA crosses SPB's HWM. Moreover, because the HWMs of the two stacks can be advantageously monitored and updated, it is also possible to verify after the program's completion if the respective HWMs have crossed. This condition can occur even where there was no instantaneous SP overlap. Thus, by monitoring the HWM cross-over, potential stack overlap problems (which can be caused by different runtime algorithms) can be avoided.

Figure 6C:
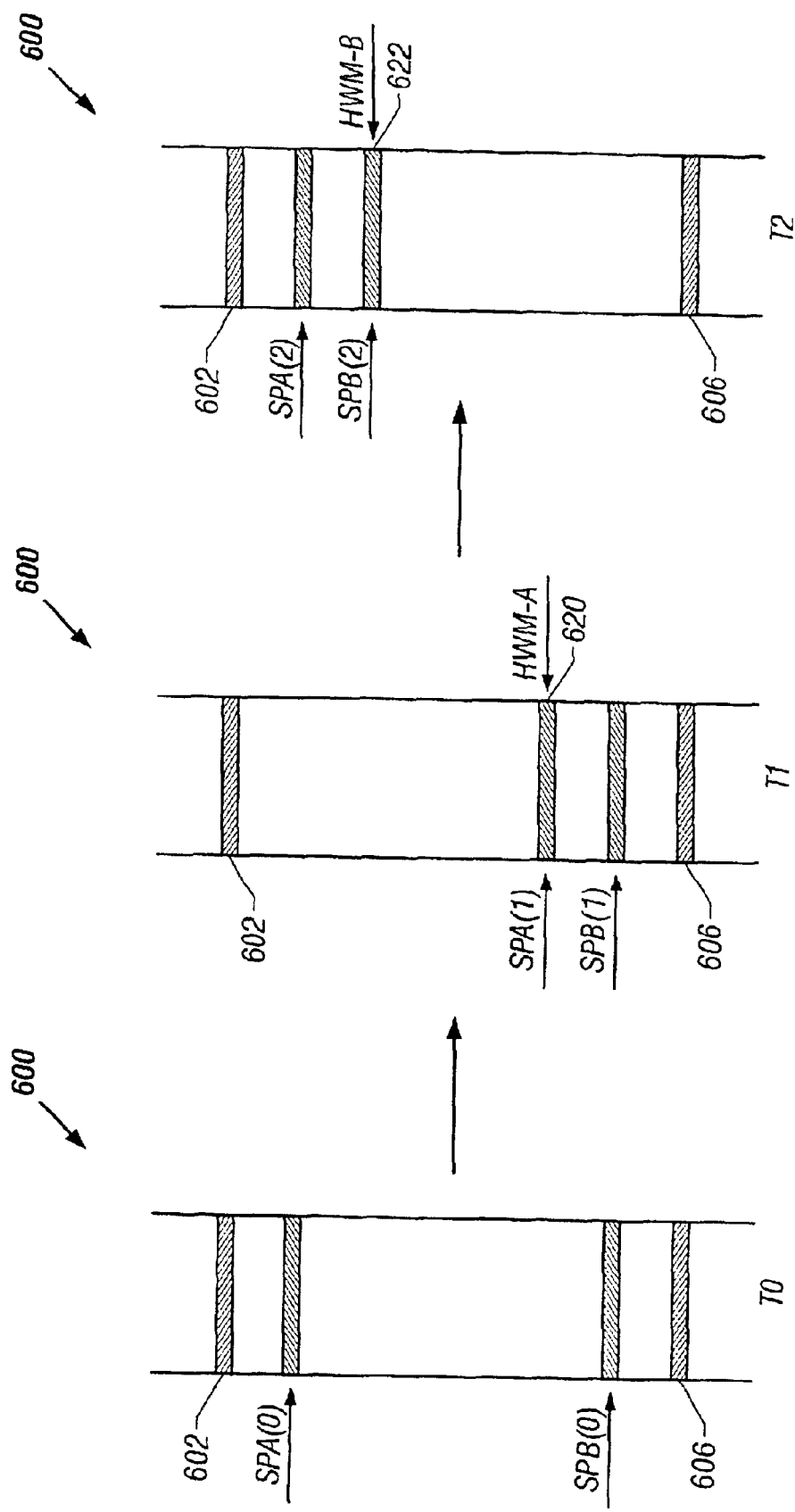
FIG. 6C depicts the exemplary two-stack arrangement where a stack pointer's high water mark is tracked in accordance with the teachings of the present invention.

FIG. 6C depicts the exemplary two-stack arrangement 600 at three instances where a stack pointer's HWM is tracked in accordance with the teachings of the present invention. At time T0, SPA(0) and SPB(0) are in a valid state, having moved from their respective stack bases. By time T1, both SPA and SPB have moved to respective new locations, exemplified by SPA(1) and SPB(1). As can be seen from FIG. 6C, there has not, been a stack pointer cross-over and, therefore, both SPA(1) and SPB(1) are in a valid state at T1 also. In similar fashion, the SPs have moved to SPA(2) and SPB(2) locations by time T2. Once again, there has been no cross-over and, consequently, no invalid SP operation has occurred. However, if the HWMs are tracked, it can be seen that the farthest location (from stack base 602) to which SPA has traveled is the location attained by SPA(1), which becomes the first stack's HWM (HWM-A) 620. The farthest location from stack base 606 to which SPB has traveled is the location attained by SPB(2), which becomes the second stack's HWM (HWM-B) 622. Since HWM-B 622 is above HWM-A 620, it is indicative that if the stacks' respective growths had been different or asynchronous, there could have been situations where actual SP cross-over would occur.

Figure 7A:
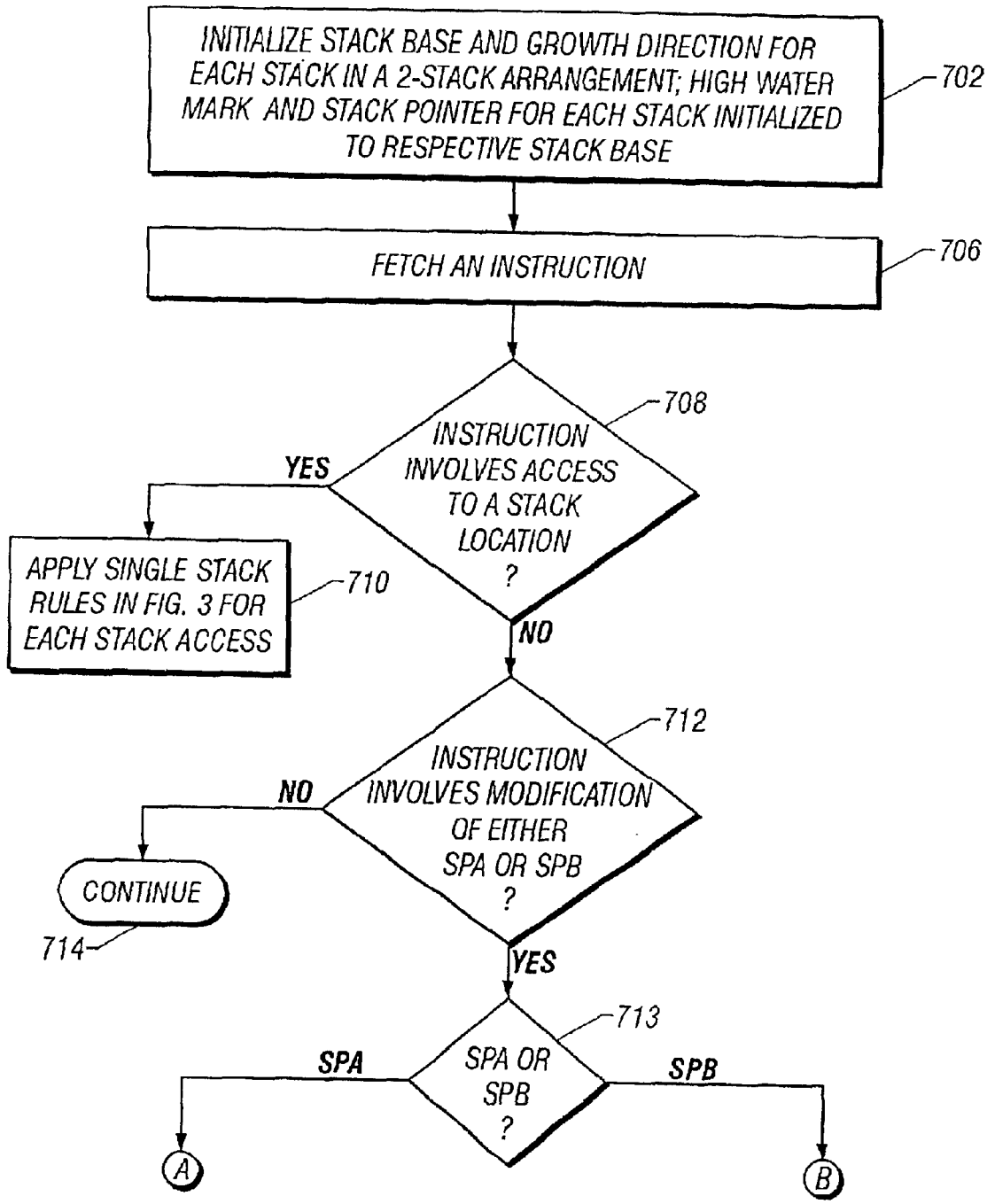
FIGS. 7A and 7B depict a flow chart of the various steps involved in an exemplary stack utilization management method for managing a two-stack arrangement in accordance with the teachings of the present invention.
Figure 7B:
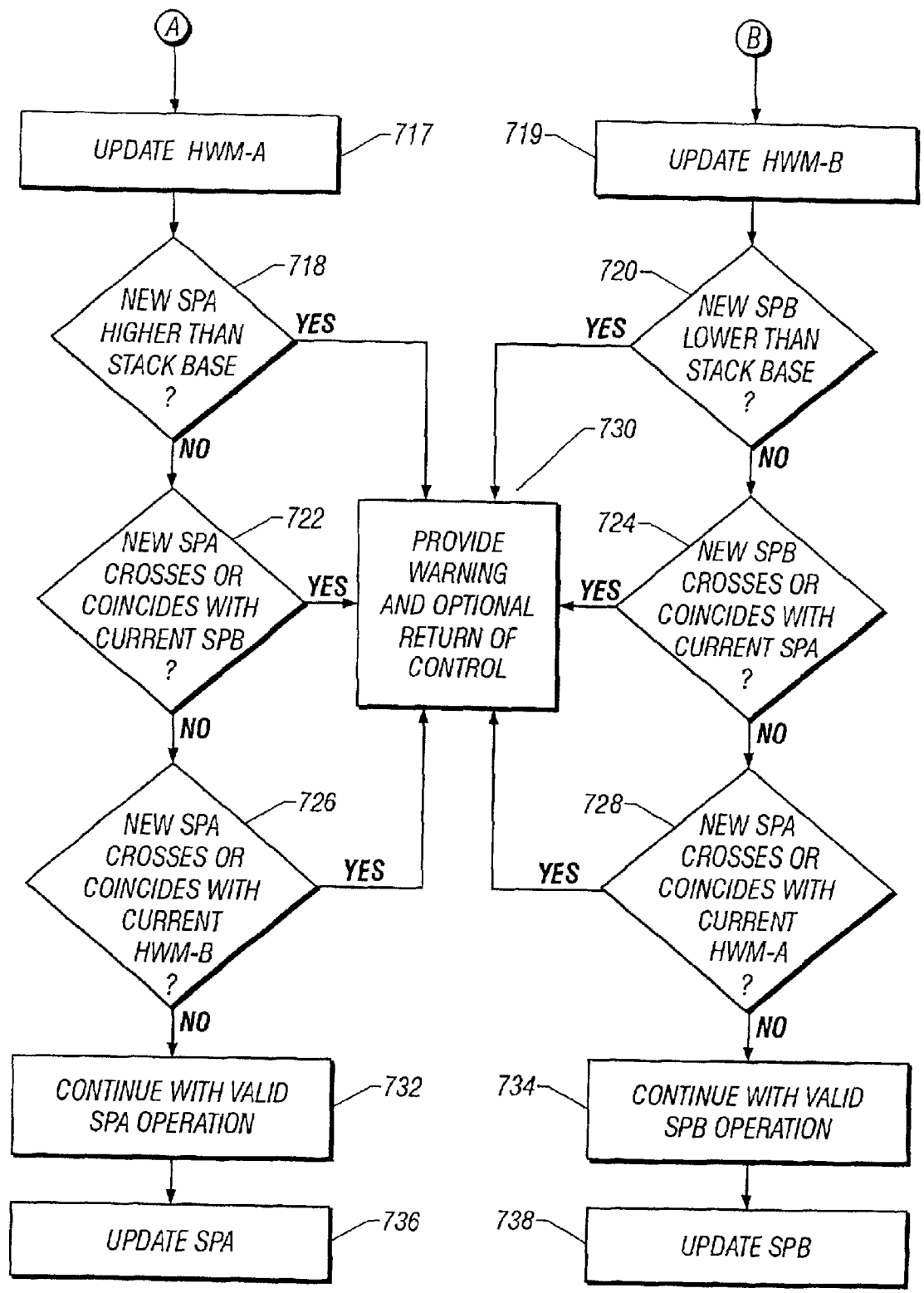

Referring now to FIGS. 7A and 7B, depicted therein is a flow chart of the various steps involved in an exemplary stack utilization management method for managing a two-stack arrangement in accordance with the teachings of the present invention. At step 702, various stack initializations take place for the two stacks of the stack arrangement. As pointed out earlier, one or more user-operable routines may be provided via appropriate API or APIs to set the various stack initializations in any combination. Thereafter, SP updates and/or HWM updates are effectuated in the normal course of the program execution as will be explained hereinbelow.

Upon fetching a program instruction at any time during the program run (step 706), a determination is made whether the instruction involves access to a stack location or requires modifying either SPA or SPB pointer. This determination is captured in decision blocks 708, 712 and 713. If the instruction involves accessing either stack, access validity rules set forth above with respect to the management of single-stack systems apply (step 710). On the other hand, if the instruction does not involve stack access or stack pointer operations, the instruction is executed normally and the process flow simply continues (step 714).

If the program instruction requires modifying SPA, a plurality of determinations are made to ensure that the stacks' integrity is not jeopardized by moving SPA from its current location to a new location. First, upon requesting an SPA operation, the associated HWM-A is updated accordingly (step 717). In decision block 718, it is determined if the new location is higher than the stack base (since this is exemplified as a high memory stack). That is, in general, a determination is made if the new location is out of range with respect to the first stack's stack base. In decision block 722, it is determined if the new SPA location crosses or coincides with the current location of SPB. In decision block 726, it is determined if the new SPA location crosses or coincides with the current HWM-B location. Similar to the single-stack management methodology described above, when any one of these conditions is met, user warning and/or optional return of control may be appropriately provided (step 730). Upon completion of these determinations, a valid SPA operation is identified which is effectuated thereafter in normal fashion (step 732). Subsequently, the current SPA pointer is updated (step 736).

Similarly, if the program instruction requires modifying SPB, a plurality of determinations are made to ensure that the stacks' integrity is not jeopardized by moving SPB from its current location to a new location. Again, HWM-B is updated accordingly when an SPB operation is requested (step 719). In decision block 720, it is determined if the new location is lower than the stack base (i.e., out of range), since this stack portion is exemplified as a low memory stack. In decision block 724, it is determined if the new SPB location crosses or coincides with the current location of SPA. In decision block 728, it is determined if the new SPB location crosses or coincides with the current HWM-A location. Again, when any one of these conditions is met, user warning and/or optional return of control may be appropriately provided (step 730). Similar to the SPA operation, a valid SPB operation is identified upon completion of these determinations, which operation is then effectuated normally (step 734). Subsequently, the current SPB pointer is updated (step 738).

Figure 8:
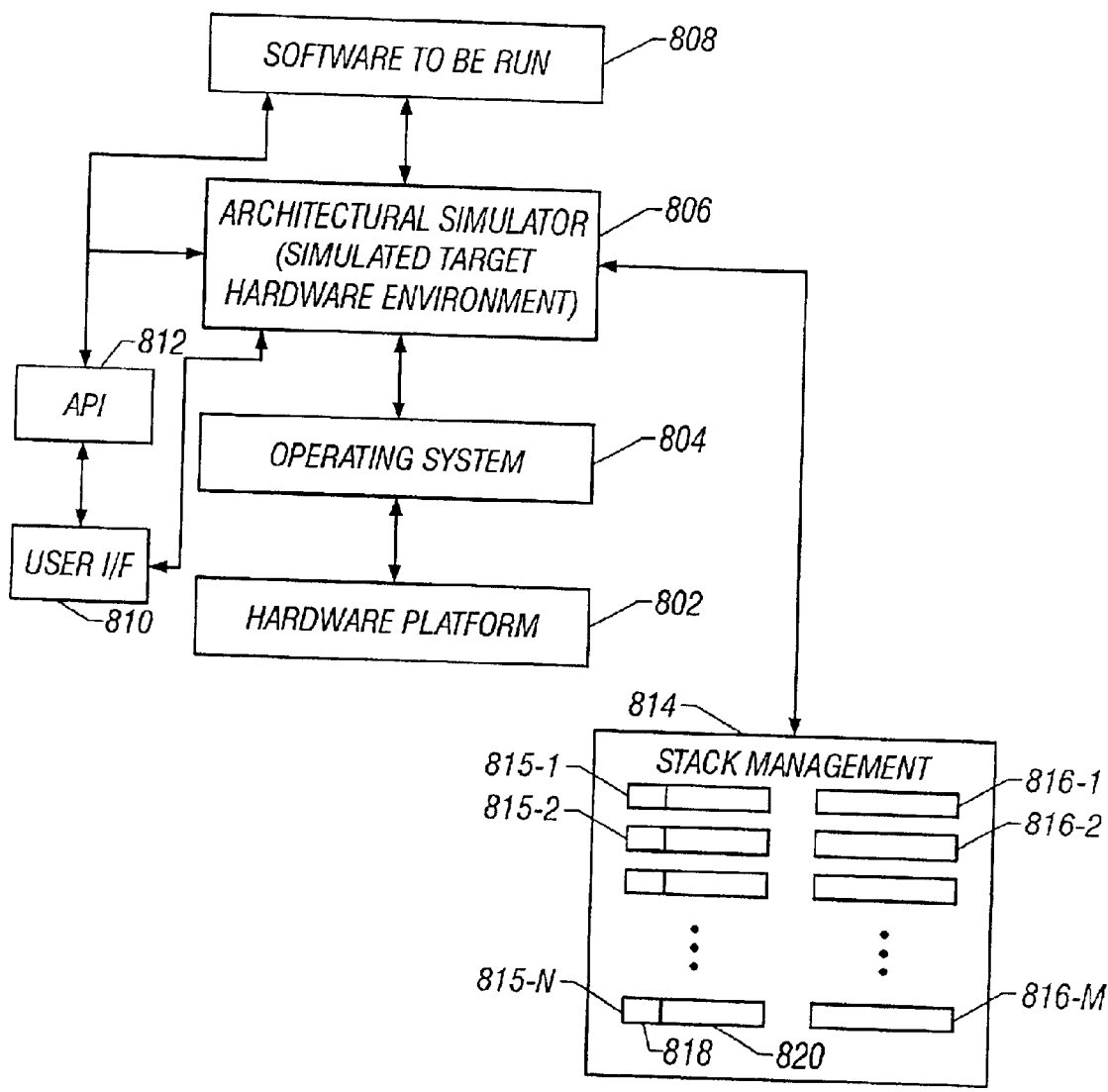
FIG. 8 depicts a high level functional block diagram of a stack utilization management system associated with an architectural simulator.

FIG. 8 depicts a high level functional block diagram of a stack utilization management system associated with an architectural simulator. A suitable hardware platform 802 (which in itself may be comprised of a high performance computing machine) is provided for hosting an architectural simulator application 806. An operating system 804 provides the software platform on top of which the architectural simulator application 806 is executed. Preferably, a debugger program and other related software/user tools may also be integrated with the architectural simulator application 806 that is optimized to simulate a target multiprocessor platform such as, e.g., a symmetric multiprocessor (SMP) system. Program software 808 intended for execution, optimization, and maintenance on the target SMP system is executed on the architectural simulator 806.

An interface 810 is provided for facilitating user interaction with the simulated environment either directly or via an API 812. Preferably, API 812 is available for the user to implement the present invention in one or more API routines that allow interactions with a stack management module 814 associated with the simulator 806. The API routines are operable to set a plurality of initial values for managing stack utilization as described in greater detail hereinabove. Reference numerals 815-1 through 815-N exemplify stack identifiers which are operable to be set by the user by means of the API routines for managing two-stack arrangements. Each stack identifier is comprised of a stack base (e.g., reference numeral 818) and a direction indicator (e.g., reference numeral 820) associated with a particular stack. Further, one or more identifiers may also be provided (reference numerals 816-1 through 816-M) for managing a plurality of unidirectional stacks in accordance with the teachings set forth above.

Figure 9:
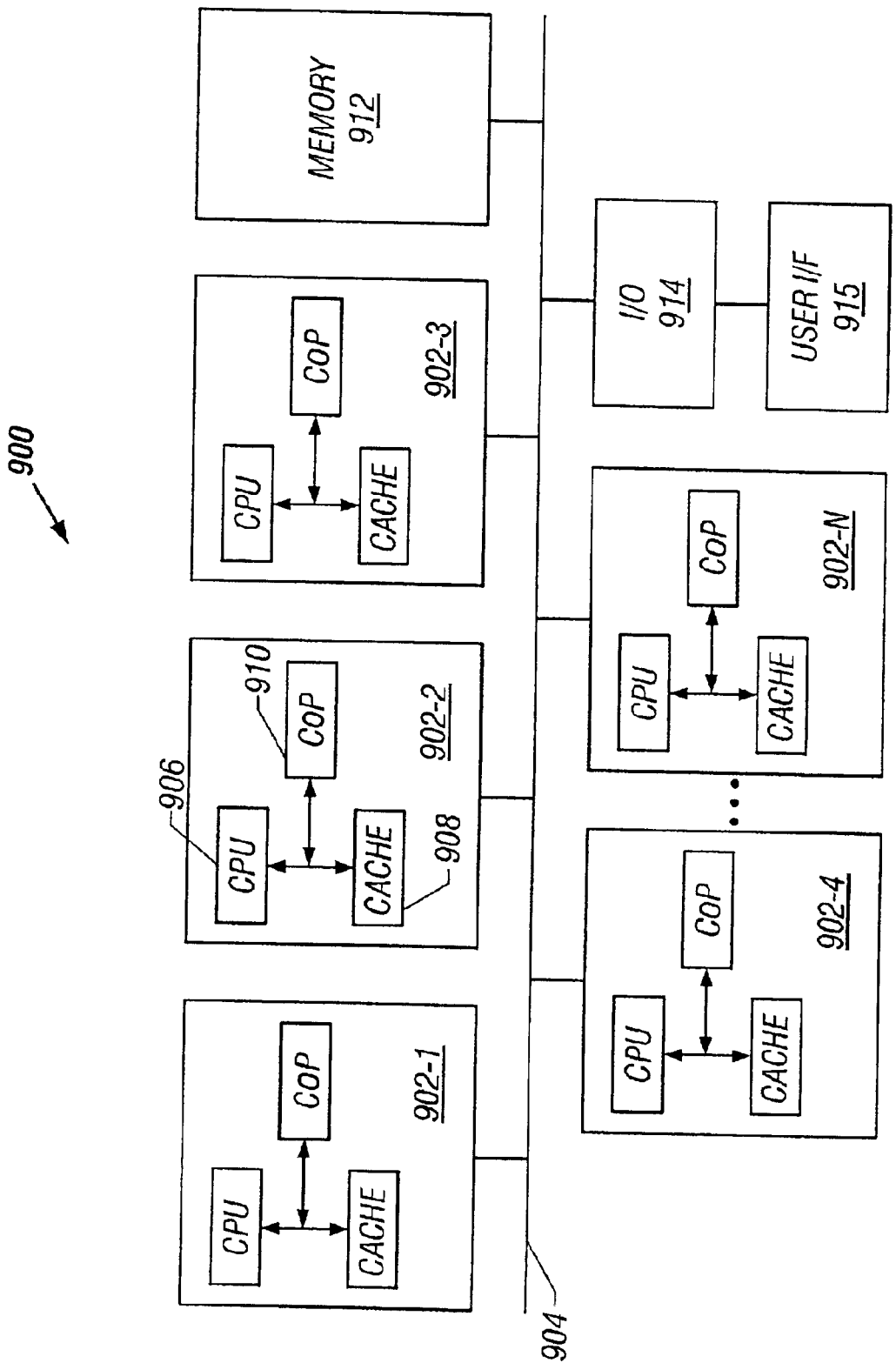
FIG. 9 depicts a block diagram of an exemplary target multiprocessing system wherein the stack utilization management system of the present invention can be advantageously utilized.

Referring now to FIG. 9, depicted therein is a block diagram of an exemplary multiprocessing (MP) system 900 wherein the stack utilization management system of the present invention can be advantageously utilized. Reference numerals 902-1 through 902-N refer to a plurality of processor complexes interconnected together via a high-performance, MP-capable bus 904. Each processor complex, e.g., processor complex 902-2, is comprised of a central processing unit (CPU) 906, a cache memory 908, and one or more coprocessors 910. Preferably, the MP system is architectured as a tightly coupled SMP system where all processors have uniform access to a main memory 912 and any input/output (I/O) device 914 in a shared fashion. As an SMP platform, each processor has equal capability to enable any kernel task to execute on any processor in the system. Whereas threads may be scheduled in parallel fashion to run on more than one processor complex, a single kernel controls all hardware and software in an exemplary implementation of the MP system 900, wherein locking and synchronization strategies provide the kernel the means of controlling MP events.

Continuing to refer to FIG. 9, each processor complex is preferably provided with its own data structures, including run queues, stacks, counters, time-of-day information, notion of current process(es) and priority. Global data structures available for the entire MP system 900 are protected by means such as semaphores and spinlocks. Furthermore, in other implementations of the MP system, the processors may be arranged as "cells" wherein each cell is comprised of a select number of processors (e.g., 4 processors), interrupts, registers and other resources.

An interface 915 is provided for facilitating interactions between the user and SMP computing environment. Analogous to the architectural simulator environment described hereinabove with reference to FIG. 8, one or more API routines may be provided for setting stack identifiers in the SMP system 900 in order to manage stack utilization when a program is executed thereon.

Based upon the foregoing Detailed Description, it should be readily apparent that the present invention provides an innovative stack utilization system and method operable in a high performance computing environment for managing stack overflow without the limitations of the state-of-the-art solutions. Because stack access or stack pointer operations are verified for overflow conditions before the program instructions are actually executed, users are provided with a more dynamic view of stack consumption. Thus, the invention allows the detection of stack overlap at the first occurrence of any potential overlap (in the case of two-stack arrangements) before any stack corruption takes place. Further, the invention obviates the need for specific bit pattern markers embedded in the stacks to detect overflow or for manually inspecting the code by placing numerous debug statements therein.

It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, while the teachings of the present invention have been particularly exemplified within the context of SMP systems and/or simulated environments therefor, those skilled in the art should recognize that the present invention can be practiced in conjunction with other hardware platforms including, for example, asymmetrical MP systems, loosely-coupled MP architectures, shared- or dedicated-cache systems, and other high performance computing machines. Furthermore, the stack utilization scheme of the present invention may be employed in conjunction with the execution of the any type of program code, e.g., application software, operating system software, API software, kernel programs, firmware, or a combination thereof. The various determinations for validating stack access and/or stack pointer operations may be implemented in software structures, hardware structures or firmware structures. Accordingly, all such modifications, extensions, variations, amendments, additions, deletions, combinations, and the like are deemed to be within the ambit of the present invention whose scope is defined solely by the claims set forth hereinbelow.

What is claimed is:

1. A method for managing utilization of a unidirectional stack, comprising:

initializing a fixed stack marker, a stack base and a stack pointer for said unidirectional stack;

initializing a high water mark for tracking said stack pointer's location during execution of a program in a computing environment, said high water mark operating to identify said stack pointer's farthest location from said stack base, wherein said farthest location is indicative of how far said stack has grown at any time program's execution;

upon fetching a program instruction to be executed in said computing environment, determining if said program instruction is operable to modify said stack pointer's current location to a new location in said unidirectional stack;

it so, further determining whether said new location is within a predetermined stack range; and providing a warning upon determining that said new location is not within said predetermined stack range.

2. The method for managing utilization of a unidirectional stack as set forth in claim 1, wherein said predetermined stack range comprises a region bounded by said stack base and said stack marker.

3. The method for managing utilization of a unidirectional stack as set forth in claim 1, wherein said predetermined stack range comprises a region bounded by said stack base and said high water mark.

4. The method for managing utilization of a unidirectional stack as set forth in claim 1, wherein said computing environment comprises an architectural simulator operable to simulate a target hardware platform.

5. The method for managing utilization of a unidirectional stack as set forth in claim 4, wherein said target hardware platform is selected from the group consisting of a symmetric multiprocessing system, an asymmetric multiprocessing system, a loosely-coupled multiprocessing system, and a tightly-coupled multiprocessing system.

6. The method for managing utilization of a unidirectional stack as set forth in claim 1, further comprising the step of returning control to a user upon determining that said new location is not within said predetermined stack range.

7. A system for managing utilization of a unidirectional stack, comprising:

means to initialize a fixed stack marker, a stack base and a stack pointer for said unidirectional stack;

means for tracking said stack pointer's location during execution of a program in a computing environment, said means operating to identify said stack pointer's farthest location from said stack base, wherein said farthest location is indicative of how far said stack has grown at any time during said program's execution;

means for determining if a program instruction is operable to modify said stack pointer's current location to a new location in said unidirectional stack; and means for providing a warning upon determining that said new location is not within a predetermined stack range associated with said unidirectional stack.

8. The system for managing utilization of a unidirectional stack as set forth in claim 7, wherein said predetermined stack range comprises a region bounded by said stack base and said stack marker.

9. The system for managing utilization of a unidirectional stack as set forth in claim 8, wherein said region includes said stack marker's location.

10. The system for managing utilization of a unidirectional stack as set forth in claim 7, wherein said computing environment comprises an architectural simulator operable to simulate a target hardware platform.

11. The system for managing utilization of a unidirectional stack as set forth in claim 10, wherein said target hardware platform is selected from the group consisting of a symmetric multiprocessing system, an asymmetric multiprocessing system, a loosely-coupled multiprocessing system, and a tightly-coupled multiprocessing system.

12. The system for managing utilization of a unidirectional stack as set forth in claim 7, wherein said predetermined stack range comprises a region bounded by said stack base and a high water mark identified by said means for tracking said stack pointer's location.

13. The system for managing utilization of a unidirectional stack as set forth in claim 12, wherein said region includes said high water mark.

* * * * *